United States Patent [19]
Ohsawa et al.

[11] Patent Number: 5,162,178
[45] Date of Patent: Nov. 10, 1992

[54] NEGATIVE ELECTRODE FOR SECONDARY BATTERY

[75] Inventors: Toshiyuki Ohsawa, Kawasaki; Toshiyuki Kabata, Yokohama; Okitoshi Kimura, Tokyo; Sachiko Yoneyama, Yokohama, all of Japan

[73] Assignee: Ricoh Company, Ltd., Tokyo, Japan

[21] Appl. No.: 632,140

[22] Filed: Dec. 21, 1990

Related U.S. Application Data

[63] Continuation-in-part of Ser. No. 483,267, Feb. 16, 1990, abandoned.

[30] Foreign Application Priority Data

Nov. 11, 1987 [JP] Japan .................. 62-283096
Nov. 11, 1987 [JP] Japan .................. 62-283097
Feb. 12, 1988 [JP] Japan .................. 63-028923

[51] Int. Cl.$^5$ ........................................... H01M 4/58
[52] U.S. Cl. .................................. 429/218; 429/194; 429/217; 429/191; 429/192; 429/213
[58] Field of Search .......... 429/194, 218, 217, 192, 429/191, 213

[56] References Cited

U.S. PATENT DOCUMENTS

| | | | |
|---|---|---|---|
| 3,660,163 | 5/1972 | Moser | 429/213 |
| 3,957,533 | 5/1976 | Mead et al. | 429/213 |
| 4,132,836 | 1/1979 | Greatbatch | 429/91 |
| 4,321,114 | 3/1982 | MacDiarmid et al. | 204/2.1 |
| 4,375,427 | 3/1983 | Miller et al. | 429/213 |
| 4,434,213 | 2/1984 | Niles et al. | 429/218 |
| 4,442,187 | 4/1984 | MacDiarmid et al. | 429/213 |
| 4,502,980 | 3/1985 | Denisevich, Jr. et al. | 252/500 |
| 4,505,841 | 3/1985 | Denisevich, Jr. | 252/500 |
| 4,517,116 | 5/1985 | Ivory et al. | 252/500 |
| 4,519,938 | 5/1985 | Papir | 252/500 |
| 4,520,086 | 5/1985 | Skotheim | 429/192 |
| 4,543,306 | 9/1985 | Dubois et al. | 429/194 |
| 4,547,442 | 10/1985 | Besenhard et al. | 429/209 |
| 4,556,617 | 12/1985 | Kruger | 429/196 |
| 4,579,796 | 4/1986 | Muramatsu | 429/198 |
| 4,624,761 | 11/1986 | Lando | 524/80 |
| 4,668,596 | 5/1987 | Schacklette et al. | 429/194 |
| 4,695,521 | 9/1987 | Schacklette et al. | 429/194 |
| 4,814,242 | 3/1989 | Maxfield et al. | 429/217 |
| 4,824,746 | 4/1989 | Belanger et al. | 429/218 |

FOREIGN PATENT DOCUMENTS 0182548  5/1986  European Pat. Off.

*Primary Examiner*—Anthony McFarlane
*Assistant Examiner*—C. Everhart
*Attorney, Agent, or Firm*—Cooper & Dunham

[57] ABSTRACT

A negative electrode for a secondary battery which has a positive electrode including a polymer active material. The negative electrode includes: a current collector beforehand roughened at one surface thereof; a first layer disposed on the roughened one surface and including a material selected from the group consisting of alkali metal and an alloy containing alkali metal; and a second layer disposed on the first layer and including an ion conductive material. A surface of the first layer has an uneven configuration which conforms with another uneven configuration of the roughened one surface of the current collector, the surface of the first layer being in contact with the second layer. A method for manufacturing the negative electrode is also disclosed.

16 Claims, 1 Drawing Sheet

NEGATIVE ELECTRODE FOR SECONDARY BATTERY

CROSS-REFERENCE TO RELATED APPLICATION

The present application is a continuation-in-part of application Ser. No. 483,267 field on Feb. 16, 1990, now abandoned.

BACKGROUND OF THE INVENTION

The present invention relates to a secondary battery (storage battery) which can be charged and repeatedly used. More particularly, the invention relates to a negative electrode structure of the secondary battery.

In these days, electric and electronic devices having a light and thin structure have been developed and thus a thin secondary battery having a light and compact structure is required to be used as a battery for these compact electric and electronic devices. For this purpose, a polymer battery has been considered and proposed to be used as such a battery. The polymer battery comprises an active material of an electrode made from a polymer material such as polypyrrole, polyaniline, polyparaphenylene, polyacetylene, etc. which polymer material is adequate for producing a light and thin battery having a compact size. Examples of such a polymer battery are disclosed in British Patent No. 216549 and U.S. Pat. No. 4,442,187. From the above-mentioned polymer material, it is possible to electrochemically form a P-type conductive or semiconductive polymer or an N-type conductive or semiconductive polymer by combining the above-mentioned polymer material with an electrolyte cation (positive ion) or anion (negative ion) to form a complex material therefrom.

This reaction can be electrochemically repeated. Therefore, the above-mentioned polymer materials can be used as an electrode material for the secondary battery which is repeatedly used by charging the battery after use (discharge). The energy density per weight of each of these polymer materials is very high when compared to conventional electrode materials, so that a secondary battery having a high energy ratio is expected to be obtained by using one of the above-mentioned polymer materials as the electrode material thereof.

An experimental result shows that the energy density of the secondary battery having a positive electrode comprising the above-mentioned polymer material is such high as 80 to 160 Ah/kg. However, no sufficient installation technique has been developed so far which technique is properly applied for actually utilizing the polymer material as the electrode of the secondary battery so as to heighten the energy density thereof. Also, the polymer material itself has not a high electric conductivity sufficient enough for use as the battery electrode. Further, the diffusibility of ion of the polymer material is limited Therefore, widening the surface area of the electrode is considered as one of effective means for utilizing the polymer material to obtain a high energy output from the battery. Especially, when used as a positive electrode of the battery, the polymer material is advantageous for heightening the energy output since the polymer material is more flexible than the inorganic materials and can be formed as a sheet or film. The electrode made from the sheet material can be rolled to form a cylindrical shape and installed in the battery (cylindrical type cell) in the same manner as the Ni-Cd battery.

The inventors of the present invention proposed, in Japanese Patent Application No. 62-168280, a sandwich type cell in which a positive electrode sheet and a negative electrode sheet are folded alternately through a separator to obtain high energy and high output from the battery. However, the negative electrode sheet which can be adequately utilized to be assembled in the battery as proposed has not been realized so far. With respect to the positive polymer electrode, a high energy density can be realized when the polymer is combined with an alkali metal to cooperate with the metal in a non-aqueous electrolytic solution. The negative electrode for this positive electrode is made from for example lithium In the secondary battery comprising the lithium negative electrode, lithium repeats dissolution and deposition during the charging process and the discharging process. In this electrochemical process, lithium cation added to the solution as an electrolytic salt is enough for repeating the process. In accordance with this theory, it has been proposed to use a metal sheet comprising no active material as the negative electrode in which the active material is compensated for by the cation dissolved in the electrolytic solution. However, with this proposed arrangement, it is difficult to maintain a predetermined sufficient discharge voltage. Also, if the active material is to be compensated for by excess charge, the positive polymer electrode will be damaged.

On the other hand, lithium can be formed as a flexible sheet of thickness less than 100 $\mu$m. Therefore, it is most desirable if lithium can be utilized as the material of the negative electrode. However, thickness of the lithium sheet becomes uneven so that the sheet loses the shape thereof as a sheet by the repetition of dissolution and deposition of lithium during charging and discharging the battery. Also, dendrites are generated from the lithium sheet electrode, which causes a short circuit between the positive electrode and the negative electrode. In order to solve these problems, it has been proposed to alloy lithium so as to prevent lithium from dissolution and avoid dendrite generation. However, it is very difficult to form a sheet from lithium alloy. For example, lithium alloy combined with aluminum is too fragile to form a sheet therefrom.

Flexible negative electrode can not be obtained from the Li-Al alloy if a layer of the Li-Al alloy is not thin in thickness thereof. However, sufficient characteristic of a charge and discharge cycle can not be provided for the secondary battery when the layer of the Li-Al alloy is thin in thickness thereof. Therefore, it is necessary to make thick the thickness of the Li-Al layer in order to ensure the sufficient characteristic of the charge and discharge cycle. Also, as another method for utilizing lithium or lithium alloy, it has been proposed to laminate the metal with a foil of nickel or stainless steel by for example pressure welding.

However, the thickness of the negative electrode made from the laminated sheet becomes more than 100 $\mu$m, which is disadvantageous for realizing a thin secondary battery. Further, as a still another method for utilizing lithium or lithium alloy, it has been proposed to form a lithium alloy layer on an aluminum sheet surface by an electrolytic process using the aluminum sheet as a substrate. However, a desired electrode sheet has not been realized by this method since the fresh lithium deposited by the electrolytic process is very active and readily reacts with the solvent.

SUMMARY OF THE INVENTION

The present invention was made considering the above-mentioned problems of the state of art. It is therefore an object of the present invention to provide a negative electrode which exhibits a highly enhanced output and guarantees a long-life of a secondary battery in the case where the negative electrode is incorporated into the secondary battery.

The object of the present invention can be achieved by a negative electrode for a secondary battery having a positive electrode comprising a polymer active material, the negative electrode comprising: a current collector beforehand roughened at one surface thereof; a first layer disposed on the roughened one surface and comprising a material selected from the group consisting of alkali metal and an alloy containing alkali metal; and a second layer disposed on the first layer and comprising an ion conductive material, a surface of the first layer having an uneven configuration which conforms with another uneven configuration of the roughened one surface of the current collector, the surface of the first layer being in contact with the second layer, and a method of manufacturing a negative electrode for a secondary battery having positive electrode comprising a polymer active material, the method comprising the steps of: preparing a current collector beforehand roughened at one surface thereof; covering the roughened one surface with an ion conductive material; and depositing electrochemically a metallic layer between the ion conductive material film and the roughened one surface in such a manner that a surface of the deposited metallic layer has an uneven configuration conforming with another uneven configuration of the roughened one surface, the surface of the deposited surface being in contact with the ion conductive material film, the metallic layer comprising a metal selected from the group consisting of alkali metal and an alloy containing alkali metal.

According to the present invention, a surface of the first layer being in contact with the second layer has an uneven configuration which conforms with another uneven configuration of the roughened one surface of the current collector, and consequently the negative electrode possesses an enlarged reaction surface which makes it possible to provide an enhanced output for the secondary battery in which the negative electrode is incorporated. Furthermore, the negative electrode of the present invention is provided with a second layer disposed on the first layer and comprising an ion conductive material, and consequently formation of undesirable dendrite on the uneven surface of the first layer is completely prevented, which guarantees a long-life of the secondary battery.

Further objects and advantages of the present invention will be apparent from the following description of the preferred embodiments of the invention as illustrated in the accompanying drawings.

DESCRIPTION OF THE PREFERRED EMBODIMENTS

Figure 1:
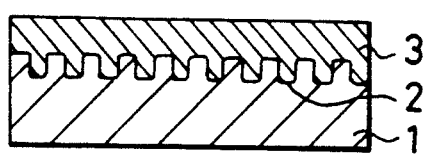
FIG. 1 is an enlarged constructional and sectional view for explaining an one embodiment of the negative electrode for a secondary battery in accordance with the present invention.

An essential construction of the negative electrode for a secondary battery in accordance with the present invention is illustrated in FIG. 1. A current collector (substrate) 1 has an uneven rough surface 2 on which a thin film layer 3 of lithium or lithium alloy is formed. The substrate surface 2 is made to be rough so that the contacting area between the current collector 1 and the lithium layer 3 is widened so as to enhance the bondage therebetween. As the material of the current collector 1 may be used a metal such as Al(aluminum), Ni(nickel), Cu(copper), Mg(magnesium), Ti(Titanium), Pt(platinum), Cr(chromium), W(tungsten), or Ag(silver), an alloy such as stainless steel, Al-Mg alloy, Al-Sn(tin) alloy, Al-Si(silicon) alloy, or Al-Ti alloy, a metal oxide such as $SnO_2$(tin oxide), $In_2O_3$(indium oxide), $Tm_2O_3$(thulium oxide), or an electric conductive material such as carbon or a carbon coated plastic plate. From the stand point of light weight, it is preferable to choose Al having an oxidized surface, or Al alloy such as Al-Mg or Al-Si.

The lithium layer 3 of the present invention may comprise a binary component alloy of lithium such as Li-Al, Li-Si, Li-Mn, Li-Mg or Li-B or a multicomponent alloy such as Li-Al-Mg or Li-Al-Mn, instead of pure lithium metal. The thickness of the lithium layer 3 is about from several ten Å to several μm. The thickness of the lithium layer is described later in detail.

As mentioned above, the negative electrode in accordance with the present invention comprises the current collector and the thin film of lithium or lithium alloy formed on the current collector. This negative electrode is installed in a battery which has a positive electrode comprising polymer active material wherein anions or cations are doped or antidoped when the battery is charged or discharged.

The polymer material comprises for example polypyrrole, polyaniline, polyazulene, poly-3-methylthiophene, polycarbazole, polyparaphenylene, polydiphenylbenzidine, polyacene etc. Also, a thermal decomposition product from each of the polymers may be used as the high polymer material The high polymer complex doped with positive ions (cations) becomes an N-type conductive high polymer while the high polymer complex doped with negative ions (anions) becomes a P-type conductive high polymer.

The dopant may comprise for example salt of lithium such as $LiPF_6$, $LiSbF_6$, $LiSCN$, $LiCF_3SO_3$, $LiAsF_6$, $LiClO_4$, $LiBF_4$, or $LiAlCl_4$ which is used as an electrolytic salt.

The solvent of the electrolytic solution of the battery is preferably an aprotic solvent which has large specific inductive capacity. Examples of such a solvent are ketone or the like, nitryl or the like, ester or the like, ether or the like, carbonate or the like, nitro compound, sulfolane compound, and mixture of the above-mentioned materials. Especially, nitryl or the like, carbonate or the like and sulfolane compound are most desirable. Examples of the desirable solvent are acetonitrile, propionitrile, butyronitrile, valeronitrile, benzonitrile, ethylene carbonate, propylene carbonate, γ-butyl lactone, sulfolane and 3methyl sulfolane. A separator is arranged between the negative electrode and the positive electrode. The separator comprises a material which has low resistance against the ion transfer in the electrolytic solution and well keeps the solution contained therein. Examples of the material of the separator are a glass fiber filter; a high polymer filter or an unwoven fabric such as polyester, Teflon (E. I. du Pont de Nemours & Co., Inc.), polyflon, polypropylene or polyamide; or an unwoven fabric consisting of a glass fiber and the high polymer material(s) mentioned above.

Also, it is possible to use a solid electrolyte material instead of the above-mentioned electrolytic solution and the separator as a component of the battery. Examples of the solid electrolyte agent of inorganic material are a porous glass, a lithium ion conductive glass such as $Li_2O-Na_2O-B_2O_3$ and $Li_4SiO_4-Li_3BO$, a halogenide such as LiI, and ceramics such as $LiBaF_3$. Also, examples of the solid electrolyte agent of organic material are polyethylene oxide (PEO), polypropylene oxide (PPO), PEO-PPO copolymer, copolymer of the above materials, multi-branched polymer thereof, and cross-linked polymer thereof. Further examples of the organic electrolyte material are complex of the above-mentioned electrolytic salt dissolved in a polymer matrix comprising a geled material such as polyvinyliden fluoride or polyacrylamide; cross-linked material of the above-mentioned complex; a polymer material having ion dissociation group such as low molecular weight polyethylene oxide or crown ether grafted to the main polymer branch; or other complex of organic or inorganic materials.

Experimental results of samples of the negative electrode are described hereinafter to further explain the present invention.

Negative Electrode Sample 1

Lithium is vapourized and coated on an etched aluminum foil (trade reference: L653 produced by Nihon Denshi Zairyo (Japan Electronic Material) Co.) to form a lithium layer of about 0.5 μm thickness.

Negative Electrode Sample 2

A nickel foil of 12 μm thickness is ground by an emery paper. The foil is then mechanically processed to form pores therein, the diameter of each pore being 0.1 mm and the density of the pores being about 100 per cm$^2$. After that, lithium is electrochemically deposited on the porous foil in a manner described below. The thickness of the lithium deposition layer is about 0.8 μm.

The above-mentioned porous nickel foil is dipped in a propylene carbonate solution containing lithium perchlorate of 3 mol/l and arranged as a positive electrode. A lithium foil of 60 μm thickness is arranged as a negative electrode. The voltage of the positive electrode is set as −3.6 V with respect to a silver standard electrode so as to deposit the lithium layer thereon.

With respect to each of the samples, a battery is assembled comprising a negative electrode of each sample, a positive electrode of polymer active material and an electrolytic solution of IM $LiBF_4$/DME(3)/PC(7). The battery is repeatedly charged and discharged with a constant current of 0.2 mA/cm$^2$. After 30 cycles of charge and discharge repetition, the battery characteristic is tested. The results of the test are represented in table 1, including samples 3 to 5 described below along with the above-mentioned samples 1 and 2 according to the present invention and an example of prior art negative electrode to be compared.

Negative Electrode Sample 3

An aluminum foil having thickness of 30 μm and purity of 99.9% is roughened in an electrolytic solution including hydrochloric acid by applying 50 V DC. After that, the aluminum foil having a roughened surface is arranged as a positive electrode in an electrolytic solution comprising aqueous solution of adipic acid ammonium of 20 g/l and 2 V is applied to the electrode so that an anodic oxidation film is formed thereon.

After that, powder of lithium aluminum alloy comprising 55% lithium and 45% aluminum is heated to the melting temperature thereof in an atmosphere of argon gas and then hot rolled on the aluminum foil mentioned above so that a lithium aluminum alloy layer of about 3 μm thickness is formed thereon. The two-layer foil is used as the negative electrode of the secondary battery.

Negative Electrode Sample 4

A duralumin sheet of 100 μm thickness is roughened by a #200 emery paper. Lithium is vaporized and coated on the substrate of this duralumin sheet to form a lithium layer of 0.5 μm thickness thereon.

Negative Electrode Sample 5

Magnesium is vaporized and coated on an aluminum substrate which is the same as the sample 1 to form a magnesium layer of 0.2 μm thickness thereon. After that, lithium is vaporized and coated on the magnesium coated aluminum substrate to form a lithium layer of 0.6 μm thickness thereon.

TABLE 1

|  | Example 1 | Example 2 | Example 3 | Example 4 | Example 5 | Example 6 | Compara. Example |
|---|---|---|---|---|---|---|---|
| Pos. electrode act. mtrl. | polypyrrole | polyaniline | polypyrrole | Polyaniline | Polyaniline | Polyaniline | Polypyrrole |

TABLE 1-continued

| | | Example 1 | Example 2 | Example 3 | Example 4 | Example 5 | Example 6 | Compara. Example |
|---|---|---|---|---|---|---|---|---|
| Neg. electrode sample No. | | 1 | 1 | 2 | 3 | 4 | 5 | Etched Al foil |
| Batt. chrct. | Intl. Opn. volt. | 3.2 V | 3.7 V | 3.2 V | 3.2 V | 3.4 V | 3.11 V | 3.1 V |
| | Coulomb ef. | 98% | 99% | 94% | 96% | 96% | 97% | 72% |
| | Dischg. cap. | 83 Ah/kg | 103 Ah/kg | 81 Ah/kg | 106 Ah/kg | 112 Ah/kg | 121 Ah/kg | 68 Ah/kg |
| | Engy. denst. | 236 Wh/kg | 356 Wh/kg | 228 Wh/kg | 312 Wh/kg | 331 Wh/kg | 346 Wh/kg | 186 Wh/kg |
| | 30 cycl. Opn. volt. | 3.3 V | 3.7 V | 3.3 V | 3.7 V | 5.2 V | 3.11 V | 3.1 V |
| | Coulomb ef. | 97% | 99% | 94% | 98% | 96% | 96% | 74% |
| | Dischg. cap. | 85 Ah/kg | 104 Ah/kg | 83 Ah/kg | 105 Ah/kg | 125 Ah/kg | 126 Ah/kg | 68 Ah/kg |
| | Engy. denst. | 243 Wh/kg | 329 Wh/kg | 231 Wh/kg | 321 Wh/kg | 340 Wh/kg | 372 Wh/kg | 188 Wh/kg |

By utilizing the above-mentioned negative electrode in accordance with the present invention, the following advantages can be obtained.

(1) The weight of the negative electrode is reduced.
(2) The negative electrode is easily handled and manipulated when assembling the battery, thus increasing the productivity of the negative electrode and the battery.
(3) Dendrites are prevented from generating when the battery is repeatedly charged and discharged.

Conventionally, it is proposed a lithium deposition method in which the lithium metal component in the electrolytic solution is deposited at the time of charging the battery comprising a negative electrode consisting of only a current collector metal. However, this proposed method is not adequate for actual use of the battery since the discharge characteristic of the battery when loaded is bad, that is the voltage drop is large. The present invention obviates this point and improves the discharge characteristic of the battery at the time when the battery is loaded.

As can be seen from the above-mentioned description, it is possible to provide a reliable secondary battery which has a high energy density characteristic and keeps the high quality during repetition of charge and discharge of the battery, being prevented from degradation of the characteristic thereof, by utilizing the negative electrode in accordance with the present invention.

The following four methods can be applied to producing the negative electrode of the present invention.

(1) The first method is a dry gas phase method such as a vacuum evaporation method or a sputtering method.
(2) The second method is an electrolytic deposition method.
(3) The third method is a method of dipping a substrate in a molten alkali metal or alkali metal alloy.
(4) The fourth method is a method of mixing dispersedly minute powder or fiber etc. in the resin and casting the mixed powder or fiber and the resin.

In accordance with the first method, it is easy to control the film thickness since the film is formed directly on a foil substrate having a roughened surface. Also, it is easy to form an alloy film by arranging a plurality of vapour sources of a different metal or changing the vapour source from one metal to another metal to form an alloy combined on the substrate. With respect to lithium alloy, it is possible to form an lithium alloy film on a surface of a sheet substrate comprising aluminum as a main component thereof.

The second method can be carried out in a non-aqueous electrolytic solution. In this electrolytic reaction, the fresh lithium is very active as mentioned before, therefore it is desirable to preform a polymer layer, especially an ion conductive material layer on the substrate. An alkali metal layer having a smooth surface is electrochemically formed between the substrate and the ion conductive material layer preformed on the substrate in the non-aqueous electrolytic solution including alkali metal cations. A required alloy film can be formed by using a substrate comprising the metal which is a component of the alloy to be formed. Also, a required alloy film can be formed by changing a cation to be electrolyzed according to the alloy to be formed.

The negative electrode in accordance with the present invention is especially advantageous when the positive electrode comprises nitrogen polymer. Examples of the nitrogen polymer are polyaniline, polypyrrole, polycarbazole and polydiphenylbenzidine. It is desirable that the electric conductivity at the time of doping is more than $10^{-3}$ S/cm.

Figure 2:
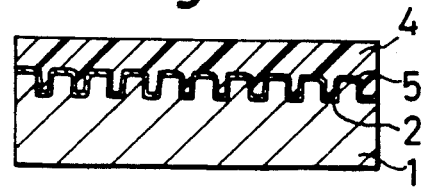
FIG. 2 is an enlarged constructional and sectional view for explaining another embodiment of the negative electrode for a secondary battery in accordance with the present invention in which problems due to the generation of the dendrites are attenuated.

Structure of another embodiment of the present invention is illustrated in FIG. 2. In this embodiment, the negative electrode comprises a current collector 1 having a surface 2 which has a widened surface area as described below, an alkali metal layer 5 and a polymer layer 4 stacked on the alkali metal layer 5.

In order to further improve the characteristic of the negative electrode of FIG. 1, it is desirable that the current collector has surface area as large as possible, therefore it is necessary to widen the current collector surface by an appropriate surface widening manner such as by forming the current collector in a form of a porous structure or forming it using a porous material, by roughening the surface thereof or by forming minute pores in the current collector. However, when such a current collector having a widened surface is used, undesirable arborescent deposition (dendrite) of lithium is generated on the uneven negative electrode surface from a top or bottom part of each minute projection or recess of the rough surface as a core of the dendrite deposition. Such a dendrite causes malfunction of the battery such as short circuit within the battery.

FIG. 2 illustrates a structure which can prevent the dendrite generation on the uneven rough or porous surface of the negative electrode though the surface structure is easy to generate the dendrite since the projections or bumps and recesses or dents of the widened uneven surface serve as a core of the dendrite. The structure of FIG. 2 comprises an ion conductive material which is desirably insoluble in the solvent contained in the electrolytic solution, the negative electrode surface being covered by the ion conductive material. Also, in accordance with the illustrated embodiment of FIG. 2 of the present invention, a thin film layer of lithium can be easily deposited electrochemically in the electrolytic solution between the current collector and the ion conductive material which is arranged to cover the current collector.

In accordance with the second embodiment of the present invention, it is possible to form a lithium layer which has a smooth surface and a high purity in comparison to the negative electrode in which the lithium layer is directly deposited on a metal surface.

The same material as the embodiment of FIG. 1 can be used as the material of the current collector 1 of FIG. 2. Also, the surface of the current collector is widened in the same manner as in the embodiment of FIG. 1.

It is especially desirable to use an ion conductive material layer 4 of the second embodiment of the present invention.

The layer of ion conductive material is mainly composed of a polymer matrix and an electrolytic salt.

An example of the polymer matrix is a polymer which has low molecular alkylene oxide as ionic dissociation group. As such polymer, there are exemplified cross-linked polymer of polyethylene oxide, cross-linked polymer of polypropylene oxide, polyvinylidene fluoride, polyacrylamide and polytetrahydrofuran. When in actual use of each polymer, the polymer matrix is made to be unsoluble in the solvent of, for example, propylene carbonate, dimethoxyethane or THF (tetrahydrofuran).

As the ion conductive material, there is exemplified a complex obtained by dissolving an electrolytic salt into the polymer matrix mentioned above. Another examples of the ion conductive material are high polymer molecules obtained by grafting with the principal chain of the polymer mentioned above a compound such as low molecular weight polyethylene oxide and crown ether which have ionic dissociation group.

Still another example of the ion conductive material is a polymer which has a $\pi$-electron conjugate and is capable of forming a complex with lithium ion and/or of conducting lithium ion. As such polymer, there are exemplified polyphenylenevinylene, polypyridine, polyquinoline, polyphenylenexylidene, polythiophene, polyphenylene, polythienylenevinylene, polyfuran, and products which are obtained by chemically or electrochemically polymerizing a substance having the following chemical structure:

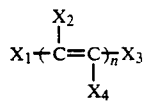

wherein $X^1$ and $X^2$ are respectively halogen atoms which are same or different from each other, $X_3$ and $X_4$ represent respectively hydrogen atoms or halogen atoms which are same or different from each other, and n represents an integer of 1 to 4.

The negative electrode of the present invention is made in such a manner that an alkali metal layer is electrochemically deposited between the current collector having a widened rough surface as mentioned above and the ion conductive material layer coated on the current collector surface in an electrolytic solution containing an alkali metal while using the current collector coated with the ion conductive material layer as an electrode of the electrolytic reaction.

The electrochemical deposition of an alkali metal is performed in such a manner that an upper surface of the deposited alkali metal layer 5 has an uneven configuration which conforms with another uneven configuration of the roughened surface 2 of the current collector as shown in FIG. 2.

The negative electrode of the above-mentioned second embodiment of the present invention constitutes a secondary battery. The structure of the battery comprising a positive electrode, an electrolyte, a separator etc. is the same as that of the afore-mentioned secondary battery of the first embodiment.

The present invention is further described hereinafter by way of example of actually produced samples of the above-mentioned second embodiment.

Negative Electrode Sample 6

An aluminum foil is ground by an emery paper of No. 200 to roughen the surface of the foil to form the above-mentioned current collector having a widened surface on which a film of cross-linked material of polyethylene oxide is coated with the use of a polymer solution made in a manner as follows.

A dichloromethane solution is prepared from 3-functional polyethylene oxide (10 wt % polyethylene oxide triol MW3060), 1 wt % tolylenediisocyanate and 0.01 wt % dibutyl tin dilaurate. This dichloromethane solution coated on the aluminum foil is hardened under the condition of 80° C. 2 h, under vacuum. After that, the thus treated aluminum foil is arranged as an electrode in 1 M LiClO$_4$/PC solution so as to conduct an electrolytic reaction in cooperation with a lithium counter electrode by applying $-0.5$ V for 3 minutes so that a lithium layer is deposited between the aluminum foil and the ion conductive cross linking high polymer of polyethylene oxide to form a negative electrode of the present invention.

Negative Electrode Sample 7

A sponge like nickel sheet etched by an electrolytic process is used as the current collector instead of the roughened aluminum foil of the sample 6. Other wise, the negative electrode of sample 7 is the same as sample 6.

Negative Electrode Sample 8

An aluminum foil of sample 6 is used as the current collector. On this current collector, a polymer layer of polyfuran is formed by electrolytic oxidation polymerization. After that, a lithium layer is deposited between the aluminum foil and the polyfuran layer in the same manner as in the sample 6. The polyfuran layer is formed as follows.

A polymerization solution is prepared from 0.2 M of furan and 0.3 M of AgClO$_4$ which are dissolved in a solvent of benzonitride. The polyfuran film is formed by electrolytic polymerization reaction under a constant voltage of 3 V and a unit charge quantity of 0.3 C/cm$^2$. After that, the lithium layer is deposited in the same manner as in the sample 6 to form a negative electrode.

Negative Electrode Sample 9

An aluminum foil of 99.99% purity and 30 $\mu$m thickness is dipped in an electrolytic solution containing hydrochloric acid and applied with 50 V DC voltage to roughen the aluminum foil surface. After that, a polyfuran film is formed on this aluminum foil by arranging the foil as a positive electrode in the same manner as in the sample 8. The complex of the aluminum foil and the polyfuran film is arranged as an electrode in a solution of 3 mole/l of LiClO$_4$/PC so as to conduct an electrolytic reaction by scanning at a sweep speed of 100 mV/sec of $-1.0$ to 0.5 V in cooperation with a lithium counter electrode so that a lithium layer is formed on the aluminum foil.

Negative Electrode Sample 10

An aluminum foil of 30 μm thickness is ground by a sandpaper of CC100CW to fully roughen the surface thereof. A polyfuran film of 10 μm thickness is formed on the aluminum foil in an electrolytic solution comprising 0.05 M of furan and 0.2 M of $LiClO_4$ which are dissolved in a solvent of benzonitrile arranging the aluminum foil as a positive electrode in cooperation with a negative electrode of nickel. After that, a lithium layer is deposited between the aluminum foil and the polyfuran film in an electrolytic solution comprising 1 M $LiClO_4$ dissolved in a solvent of propylene carbonate by conducting electrolytic reduction at a constant electric current of 1 $mA/cm^2$ and a unit charge quantity of 150 $C/cm^2$ with the use of the aluminum-polyfuran complex as a negative electrode in cooperation with a positive electrode of platinum.

Comparative Negative Electrode Sample

The same current collector as in the sample 6 is used for forming the negative electrode of this sample to be compared.

Experiment was made with the use of each sample of negative electrode in cooperation with a positive electrode (polypyrrole) comprising a polymer active material in an electrolytic solution comprising 1 M $LiBF_4$/DME(3)/PC(7). In the experiment, charge and discharge of the battery were repeated 300 times with a constant current of 0.2 $mA/cm^2$ and after that the battery was checked whether the dendrite was generated or not. In the sample of the comparative negative electrode, arborescent growth was found on the surface thereof.

Characteristic experimental result of examples of each negative electrode sample is represented in the following table 2.

TABLE 2

| Negative Electrode | | | Sample 6 | Sample 7 | Sample 8 | Sample 9 | Sample 10 | Sample 11 | Sample 12 | Comp. samp. | Lithium |
|---|---|---|---|---|---|---|---|---|---|---|---|
| Batt. chrct. | Intl. | Opn. volt. (V) | 3.3 | 3.3 | 3.3 | 3.4 | 2.9 | 3.3 | 3.2 | 3.1 | 3.4 |
| | | Coulomb ef. (%) | 98 | 97 | 97 | 98 | 96 | 94 | 94 | 72 | 98 |
| | | Dischg. cap. (Ah/kg) | 78 | 76 | 82 | 81 | 82 | 81 | 79 | 68 | 87 |
| | | Engy. denst. (Wh/kg) | 205 | 212 | 223 | 229 | 201 | 216 | 230 | 186 | 226 |
| | 30 cycl. | Opn. volt. (V) | 3.1 | 3.1 | 3.2 | 3.3 | 2.9 | 3.3 | 3.3 | 3.1 | 3.2 |
| | | Coulomb ef. (%) | 93 | 91 | 92 | 94 | 95 | 96 | 96 | 74 | 94 |
| | | Dischg. cap. (Ah/kg) | 76 | 77 | 82 | 83 | 88 | 86 | 86 | 67 | 83 |
| | | Engy. denst. (Wh/kg) | 210 | 203 | 218 | 216 | 246 | 260 | 252 | 188 | 212 |
| | | dendrite. | None | None | None | None | None | None | None | None | Found |

Negative Electrode Sample 11

A polyester film of 30 μm thickness is blasted by #100 emery grains under pressure of 1 $kg/cm^2$. An ITO film of 3000 Å thickness is coated on the polyester film by a vacuum evaporation method to form an electrically conductive film.

A casting solution is prepared by dissolving 100 g of polyethylene oxide (PEO), 25 g of $LiBF_4$, 0.06 g of dibutyl tin dilaurate, 8.5 g of tolylene −2,4-diisocyanate and 40 g of propylene carbonate (PC) in 100 g of methylethylketone. The polyester-ITO film is applied with the casting solution by casting method. The thus obtained composite electrode is heated at a temperature of 70° C. for 15 minutes to form a layer of cross-linked PEO on the ITO layer of the electrode.

After that, a lithium film is electrochemically deposited between the ITO layer and the PEO layer by arranging the polyester-ITO-PEO electrode as a functional (positive) electrode in cooperation with a negative electrode of platinum in an electrolytic solution comprising 1 M $LiBF_4$ dissolved in a solvent of propylene carbonate at a constant voltage level of 0 V vs Li/Li+ with a unit charge quantity of 120 $C/cm^2$.

Negative Electrode Sample 12

A nickel foil of 10 μm thickness is blasted by #200 emery grains under pressure of 1 $kg/cm^2$. After that, a PEO layer of 15 82 m thickness is formed on the nickel foil in the same manner as in the sample 11. After that, a lithium layer is deposited between the nickel layer and the PEO layer in an electrolytic solution comprising 2 M $LiBF_4$ dissolved in a solvent of propylene carbonate at a constant voltage of 0.05 V with an electric current rate of 100 $C/cm^2$.

The negative electrode in accordance with the present invention illustrated in FIGS. 1 and 2 is further described hereinafter in connection with the dimensions thereof.

The thickness of the alkali metal layer is from 10 Å to 5 μm, preferably 50 Å to 2 μm. Voltage becomes unstable if the thickness is less than 10 Å. On the other hand, reliable contact or bondage to the current collector is not guaranteed if the thickness is more than 5 μm.

The thickness of the current collector is preferably between 5 and 120 μm. Strength of the current collector is insufficient if the thickness is less than 5 μm. On the other hand, if the thickness is more than 120 μm, it becomes difficult to actually install the negative sheet electrode of the present invention to a secondary battery, besides the energy density of the entire battery is reduced.

The thickness of the polymer layer is preferably between 100 Å and 100 μm. If the thickness is less than 100 Å, a fresh lithium layer can not be maintained. On the other hand, if the thickness is more than 100 μm, the energy density is reduced and the inner resistance of the battery highly increases.

With the roughing method described with respect to the negative electrode shown in FIGS. 1 and 2, there is generally produced minute recesses each having 10 μm to 100 μm of depth and 0.5 μm to 5 μm of an opening width.

In the negative electrode illustrated in FIG. 2, an upper surface of the metal layer 5 formed on an uneven surface of the current collector 1 has an uneven surface which conforms with an uneven surface 2 of the current collector 1, whereby the upper surface of the metal layer 5 is highly enlarged to thereby guarantee a high output of secondary battery in which the negative electrode is incorporated. The polymer layer 4 formed on the metal layer 5 functions so as to prevent the formation of dendrites caused by concentration of electric field on each minute projection or recess of the metal layer 5, to thereby ensure a long life of the secondary battery.

Figure 3:
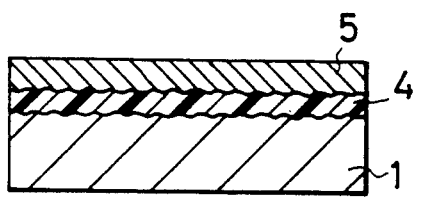
FIG. 3 is a constructional view in section of still another embodiment of the negative electrode for a secondary battery in accordance with the present invention in which problems due to the generation of the dendrites are attenuated.

FIG. 3 represents a constructional view in section of still another embodiments of the negative electrode for a secondary battery in accordance with the present invention, in which the alkali metal layer 5 is disposed on the current collector 1, and the iron conductive material layer 4 is formed between the current collector 1 and alkali metal layer 5.

Figure 4:
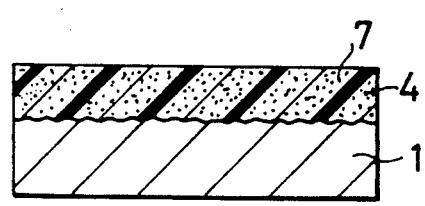
FIG. 4 is a constructional view in section of further embodiment of the negative electrode for a secondary battery in accordance with the present invention in which problems due to the generation of the dendrites are attenuated.

FIG. 4 represents a constructional view in section of further embodiments of the negative electrode for a secondary battery in accordance with the present invention, in which the ion conductive material layer 4 into which alkali metal 7 is mixed dispersedly is disposed on the current collector 1.

The materials of the current collector 1, the ion conductive material layer 4 and the alkali metal 5,7 in the embodiments of FIGS. 3 and 4 each is the same as that of the aforementioned embodiments of FIGS. 1 and 2.

FIGS. 5 to 8 represent further examples of the negative electrode in accordance with the present invention in which through holes 6 are formed in the current collector 1 as illustrated in the drawings.

Figure 5:
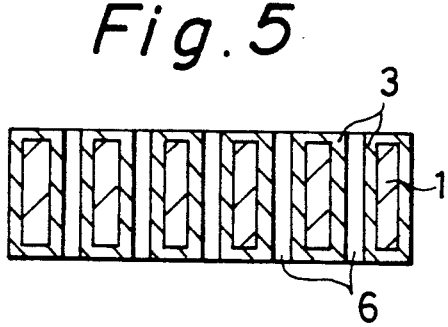
FIG. 5 is a constructional view in section of a negative electrode improved from the negative electrode of FIG. 1.

In FIG. 5, the layer 3 mainly comprising alkali metal is disposed on the surface of the current collector 1 and through holes 6.

Figure 6:
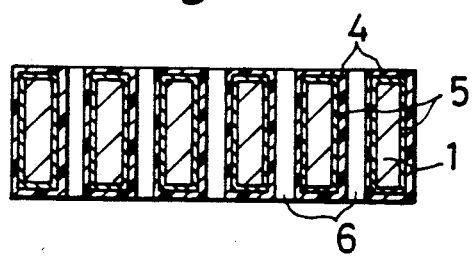
FIG. 6 is a constructional view in section of a negative electrode improved from the negative electrode of FIG. 2.

In FIG. 6, the ion conductive material layer 4 is disposed on the surface of the current collector 1 and the through holes 6, and the alkali metal layer 5 is formed between the polymer layer 4 and the surface mentioned above.

Figure 7:
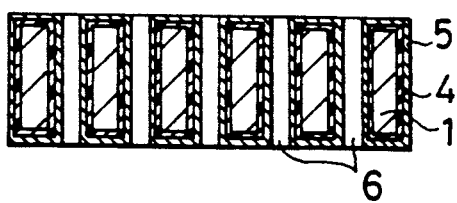
FIG. 7 is a constructional view in section of a negative electrode improved from the negative electrode of FIG. 3.

In FIG. 7, the alkali metal layer 5 is disposed on the surface of the current collector 1 and the through holes 6, and the ion conductive material layer 4 is formed between the alkali metal layer 5 and the surface mentioned above.

Figure 8:
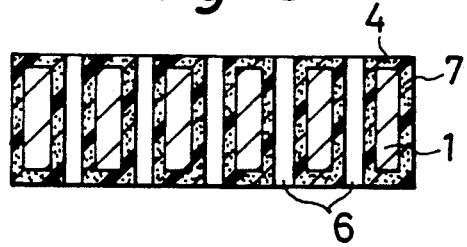
FIG. 8 is a constructional view in section of a negative electrode improved from the negative electrode of FIG. 4.

In FIG. 8, the ion conductive material layer 4 into which alkali metal 7 is mixed dispersedly is disposed on the surface of the current collector 1 and the through holes 6.

The materials of the current collector 1, the ion conductive material layer 4 and the alkali metal 5,7 in the embodiments of FIGS. 5 to 8 each is the same as that of the aforementioned embodiments of FIGS. 1 to 4.

The through hole may be of any sectional shape, for example, a triangle, a square, any other polygons, a circle, an oval, a combination thereof or any random shape may be adopted. The through holes are preferably formed perpendicularly to the current collector surface and have a uniform size. However, according to the condition for forming the active material layer, the through hole may be inclined, for example, by an angle of 45 degrees or less.

Also, in the case where the active material is formed electrochemically on the current collector, each through hole has desirably a shape which avoids concentration of electric field to a part of the through hole such as a sharp dent. Therefore, the shape of the through hole is desirably rounded without an angular corner. The size of the through hole is about from 0.5 to 1000 $\mu$m, preferably about from 1 to 500 $\mu$m, most desirably about from 1 to 200 $\mu$m. If the size is less than 0.5 $\mu$m, the strength of the current collector becomes insufficient. On the other hand, if the size is more than 1000 $\mu$m, it becomes difficult to fill the through hole with the active material.

The ratio of the area of the total through holes with respect to the entire area of the current collector is about from 1 to 70%, preferably about from 5 to 30%, most desirably about from 10 to 27%. If the through hole area ratio is less than 1%, sufficient contact between the upper surface and the rear surface is not obtained. On the other hand, if the through hole area ratio is more than 70%, the ion collector itself is weakened.

The through holes may be disposed in a regular arrangement such as on a lattice cross lines or in a zigzag arrangement. Instead, they may be disposed at random. However, the through holes are desirably distributed evenly.

The through holes may be formed by a mechanical process such as press stamping of the current collector foil, a chemical or electrochemical process such as etching of the metal sheet or an electrocast plating process in which a metal is electroformingly deposited on an electrode having inactive portions corresponding to the through holes to be formed so that an ion collector sheet having through holes formed therein is obtained. It is desirable to adapt the electrocast plating process since the through holes are formed simultaneously with producing the current collector sheet.

Due to the through hole, the electrolytic solution can be held in the hole, accordingly, in a case where sheet-like negative electrode is manufactured by a closely contacting process, the electrolytic solution can be supplied sufficiently to the substrate. If no through hole is not provided at the current collector in case of a cylindrical negative electrode, it is difficult for the electrolytic solution to be held sufficiently on the separator, accordingly a plastic secondary battery cannot bring the ability to the full.

Also, it is possible to improve the battery characteristic by roughening the surface of the current collector instead of forming through holes therein as mentioned above. The roughened surface has a number of microscopic bumps and dents which have desirably a shape which avoids concentration of the electric field during the electrochemical process for forming an active material on the the current collector by an electrolytic method, as in the case of the current collector having through holes formed therein mentioned above. That is, the bumps and dents each is preferably of same shape and size and desirably repeated by a constant interval less than 100 $\mu$m. Also, the shape of the bumps and dents each is desirably not sharp. The current collector can be roughened by a mechanical process with the use of an emery paper, another grinding material or grinding machine, or by an electrochemical process such as an ion sputtering method and an electrolytic etching method. The current collector may be processed to form a woven or unwoven sheet. It seems desirable to adopt the blasting method or the electrolytic etching method since the surface roughening process can be easily and reliably carried out. Also, it is desirable that the roughening process be carried out in an inert gas atmosphere. By roughening the current collector surface the contact area between the collector and the active material coating the roughened surface is increased. Consequently, current collection efficiency is increased and a reliable battery having a prolonged service life can be realized since the active material comes in reliable and secures contact with the current collector.

It is possible to adopt the through hole structure in addition to the rough surface structure for one current collector. Of course, it is possible to select one of the structures as desired. When both of the structures are to be adopted, either process, that is, forming through holes or roughening the surface may be carried out first.

As can be seen from the above-mentioned description, by applying the negative electrode of the present invention to a secondary battery in accordance with the first embodiment to the fourth embodiment of the present invention as well as the fifth embodiment to the eighth embodiment which are improved from the first to fourth embodiments, respectively, it becomes possible to provide a secondary battery which has a high energy density and maintains high characteristics unchanged even after a number of repetition of charge and discharge of the battery, thus increasing the reliability thereof.

Figure 9:
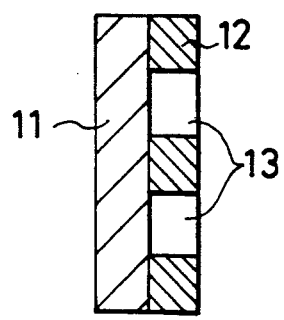
FIG. 9 and 10 are constructional views in section of still further embodiment of the negative electrode for a secondary battery in accordance with the present invention.
Figure 10:
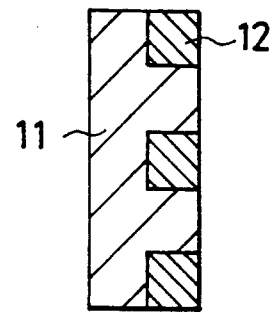

Still further embodiments of the negative electrode in accordance with the present invention are illustrated in section in FIGS. 9 and 10. In the drawings, numeral 11 designates a lithium sheet or a lithium alloy sheet. Numeral 12 designates a current collector sheet and numeral 13 designates a through hole. As can be seen from FIG. 5, the lithium sheet 11 and the current collector 12 having through holes 13 are bonded by for example press welding. The embodiment of FIG. 10 is formed by further pressing the lithium sheet together with and against the current collector after the structure of FIG. 9 is formed, so that lithium material 11 is urged to fill into the through holes of the current collector 12. With this structure of FIG. 10, the current collector and the lithium sheet are further strongly combined with each other so that the lithium sheet will never be separated from the current collector and current collection efficiency of the negative electrode is heightened.

The through hole of embodiments of FIGS. 9 and 10 each has a shape of, for example, a circle, an oval, a polygon, a pentagram, or a combination of the above-mentioned shapes. The ratio of the total through hole area with respect to the entire area of the current collector including the through hole area is about 35% to 85%, preferably about 40% to 75%. If the through hole area ratio is more than 85%, the mechanical strength of the current collector itself is reduced and the lithium or lithium alloy sheet is not securely combined to the current collector. On the other hand, if the through hole area ratio is less than 35%, only one side of the negative electrode is substantially used for performing the battery function thus degrading the efficiency and the characteristic of the battery.

The material of the current collector of the embodiments of FIGS. 9 and 10 each is the same as that of the aforementioned embodiments of FIGS. 1 to 4.

The thickness of the current collector sheet of the embodiment of FIG. 9 or 10 is about 5 to 200 $\mu m$, preferably about 10 to 100 $\mu m$ from the stand point of strength of the negative electrode to make it possible to reduce the weight thereof and realize a thin negative electrode. Also, the current collector is desirably processed to have a widened uneven rough surface by a mechanical etching treatment, a chemical etching treatment or an electrolytic etching treatment so that the contacting area between the lithium sheet and the current collector is increased and current collecting efficiency is heightened.

Examples of the active material of the negative electrode of the embodiment of the present invention are lithium and a lithium alloy such as Li-Al, Li-Mg and Li-Si.

The negative electrode in accordance with the present invention is applied to a secondary battery preferably in a manner as proposed by the inventors of this invention in Japanese Patent Application No. 62-168280 in which a positive electrode sheet and a negative electrode sheet are alternately superposed and folded together in an electrolytic solution so as to enhance the output of the battery. The negative electrode structure of the present invention is easy to handle and manipulate to reliably assemble the battery having the above-mentioned structure without being accidentally damaged in the process of fabricating the battery which is light weighted, thin and compact in size, and of high quality.

The secondary battery to which the negative electrode of the present invention is applied basically comprises a positive electrode, a negative electrode, and an electrolytic solution. A separator may be arranged between the negative and positive electrodes. The electrolytic solution comprises a solvent and an electrolyte. A solid electrolyte may be used instead of the liquid electrolytic solution.

Examples of the active material of the positive electrode of the battery to which the negative electrode of the present invention is applied are, as used in general, a metal oxide such as $TiO_2$, $Cr_2O_3$, $V_2O_6$, $V_6O_{13}$, $MnO_2$, $CuO$, $LiCrO_2$, $MoO_3$, $Cu_5V_2O_{16}$, a metal sulfide such as $TiS_2$, $FeS$, $CuCoS_4$, $MoS_2$, graphite which enables to dope ions, and an electric conductive polymer such as polyaniline, polypyrrole, poly-3-methylthiophene, polymer of diphenylbenzidine. The above-mentioned materials can be used as the active material of the positive electrode. However, the conductive high polymer is desirable when considering a sheet like positive electrode which is foldable or can be rolled to form a cylindrical type cell.

The current conductive polymer is doped by anions to accumulate energy and discharges the energy through an outer circuit when being antidoped. The battery of the above-mentioned embodiment can be used as a secondary battery since the doping and antidoping processes are reversible in the embodiment. A negative ion can be used as a dopant of the high polymer The polymer complex doped with the negative ion becomes a P-type conductive polymer. A P-type semiconductor material can be used as the positive electrode. Examples of the negative ion are an anion of a halogenide of a Va group element such as $PF_5^-$, $SbF_5^-$, $AsF_6^-$, $SbCl_6^-$; an anion of a halogenide of a IIIa group element such as $BF_4^-$; and a perchlorate anion such as $ClO_4^-$. Examples of the compound from which the above-mentioned each dopant is obtained are $LiPF_6$, $LiSbF_6$, $LiAsF_6$, $LiClO_4$, $NaClO_4$, $KI$, $KPF_6$, $KSbF_6$, $KAsF_6$, $KClO_4$, $[(n-Bu)_4N]^+.AsF_6^-$, $[(n-Bu)_4N]^+.ClO_4^-$, $LiAlCl_4$ and $LiBF_4$.

If a separator is used, the separator comprises the same material as the separator of the aforementioned embodiment.

Also, it is possible to use a solid electrolyte instead of the liquid electrolytic solution and the separator. Examples of the inorganic solid electrolyte are a metal halogenide such as $AgCl$, $AgBr$, $AgI$, or $LiI$; $RbAg_4I_4$; and $RbAg_4I_4CN$. Also, examples of the organic solid electrolyte are a complex comprising the above-mentioned electrolytic salt dissolved in a polymer matrix of polyethylene oxide, polypropylene oxide, polyvinylidene fluoride, or polyacrylamide; a cross-linked material of the above-mentioned complexes; and a high polymer electrolyte comprising an ion dissociation radical such as polyethylene oxide of small molecular weight, or crown ether grafted to a polymer main branch.

Note that the metal which constitutes the negative electrode of the present invention is not limited to lithium or a lithium alloy which is referred to as an example in the description. Another metal of the alkali metal group or an alloy thereof may be used as the negative electrode material. In this specification and the appended claims, the term "alkali metal" is to be comprehended to include the alkali metal alloy as well as the alkali metal itself of the Ia group of the periodic table.

Many widely different embodiments of the present invention may be constructed without departing from the spirit and scope of the present invention. It should be understood that the present invention is not limited to the specific embodiments described in this specification, except as defined in the appended claims.

What is claimed is:

1. A negative electrode for a secondary battery having a positive electrode comprising a polymer active material, said negative electrode comprising:
   a current collector roughened at one surface thereof in such a manner as to have a plurality of recesses on said one surface;
   a first layer disposed on said roughened one surface and comprising a material selected from the group consisting of alkali metal and an alloy containing alkali metal; and
   a second layer disposed on said first layer and comprising an ion conductive material,
   said first layer being disposed at one surface thereof on respective walls of said current collector defining said recesses, and defining a plurality of smaller recesses than said recesses at the other surface thereof, and said respective smaller recesses being filled up with said ion conductive material.

2. A negative electrode for a secondary battery according to claim 1, in which said current collector is made of one material selected from the group consisting of aluminum and alloy containing aluminum as a main component thereof.

3. A negative electrode for a secondary battery according to claim 2, in which said first layer consists of only said alkali metal.

4. A negative electrode for a secondary battery according to claim 3, in which said first layer consists of only lithium.

5. A negative electrode for a secondary battery according to claim 2, in which said first layer consists of only an alloy containing alkali metal.

6. A negative electrode for a secondary battery according to claim 5, in which said first layer consists of only an alloy containing lithium.

7. A negative electrode for a secondary battery according to claim 1, in which said roughened one surface is formed by providing a porous structure in said current collector.

8. A negative electrode for a secondary battery according to claim 1, in which said roughened one surface is formed by providing minute bumps and dents on said one surface of said current collector.

9. A negative electrode for a secondary battery according to claim 2, in which said roughened one surface is formed by a blasting method.

10. A negative electrode for a secondary battery according to claim 2, in which said roughened one surface is formed by an etching method.

11. A negative electrode for a secondary battery according to claim 1, in which said ion conductive material comprises a polymer which has a $\pi$-electron conjugate.

12. A negative electrode for a secondary battery according to claim 11, in which said polymer comprises one material selected from the group consisting of polyphenylenevinylene, polypyridine, polyquinoline, polyphenylenexylidene, polythiophene, polyfuran, polyphenylene, and polythienylenevinylene.

13. A negative electrode for a secondary battery according to claim 1, in which said ion conductive material comprises a polymer which has low molecular alkylene oxide as an ionic dissociation group.

14. A negative electrode for a secondary battery according to claim 13, in which said polymer comprises one material selected from the group consisting of cross-linked polymer of polyethylene oxide, cross-linked polymer of polypropylene oxide and polytetrahydrofuran.

15. A negative electrode for a secondary battery according to claim 1, in which said first layer has a thickness of 10 Å to 5 $\mu$m, and said second layer has a thickness of 100 Å to 100 $\mu$m.

16. A negative electrode for a secondary battery according to claim 1, in which said current collector has a thickness of 5 $\mu$m to 120 $\mu$m.

* * * * *